United States Patent [19]

Cottatellucci

[11] 4,232,387
[45] Nov. 4, 1980

[54] DATA-TRANSMISSION SYSTEM USING BINARY SPLIT-PHASE CODE

[75] Inventor: Ezio Cottatellucci, Milan, Italy

[73] Assignee: Societa Italiana Telecomunicazioni Siemens S.p.A., Milan, Italy

[21] Appl. No.: 970,147

[22] Filed: Dec. 18, 1978

[30] Foreign Application Priority Data

Dec. 21, 1977 [IT] Italy ................................ 31006 A/77

[51] Int. Cl.³ .......................... G08C 25/00; H04L 7/02
[52] U.S. Cl. ........................................ 371/47; 375/110
[58] Field of Search ............... 340/146.1 D; 178/69.1; 179/15 BS

[56] References Cited

U.S. PATENT DOCUMENTS

| | | | |
|---|---|---|---|
| 3,733,585 | 5/1973 | Merlo | 340/146.1 D |
| 3,783,383 | 1/1974 | Forster et al. | 178/69.1 X |
| 3,916,379 | 10/1975 | Dulaney et al. | 340/146.1 D X |
| 3,938,082 | 2/1976 | Schowe, Jr. | 340/146.1 D |
| 4,010,421 | 3/1977 | Lind | 178/69.1 X |

*Primary Examiner*—David H. Malzahn
*Attorney, Agent, or Firm*—Karl F. Ross

[57] ABSTRACT

For the transmission of binary signals in a succession of pulse cycles, a message pulse generated at a transmitting station during the first half of a cycle is inverted in the second half thereof before being sent over a line to a remote receiving station. There a synchronization signal is extracted from the incoming pulse train to produce a series of equispaced timing pulses normally occurring in the middle of the second half of each cycle. This incoming pulse train is subtractively combined with a replica thereof, relatively phase-shifted by half a cycle, to produce a ternary pulse train which is sampled by the timing pulses to reproduce the original binary pulse train. An error-rate sensor shifts the series of timing pulses by a half-cycle upon detecting any significant disalignment between them and the correct sampling instants.

6 Claims, 6 Drawing Figures

DATA-TRANSMISSION SYSTEM USING BINARY SPLIT-PHASE CODE

FIELD OF THE INVENTION

My present invention relates to a system for the transmission of binary signals over a communication link, especially a wide-band physical carrier such as a coaxial cable or an optical fiber, for example.

BACKGROUND OF THE INVENTION

Binary pulse trains used for the transmission of data or quantized voice samples, e.g. from a PCM terminal, are often transcoded for the purpose of avoiding the occurrence of long series of identical bits which frequently come into existence with natural coding. Thus, an extended all-zero or all-one sequence may result in loss of synchronism at the receiving station; other disadvantages include significant fluctuations in the average transmitting power and difficulties in detecting bit errors at the receiving end.

Particularly in the field of fiber-optical signaling, various codes have already been proposed for solving these problems. See, for example, an article entitled "Optical Pulse Formats for Fiber-Optical Digital Communications" by Yoshitaka Takasaki et al, published Apr. 4, 1976 in IEEE Transactions on Communications, Vol. Com. 24, p. 404.

The known codes, however, require a substantially higher optical power which may exceed by about 1.5 to 7.2 dB the power needed for the transmission of a pure binary code; see Table V of the aforementioned article. Moreover, these prior systems generally fail to satisfy the need for a quick and efficient modification of the decoding circuitry in response to detection of an excessive number of bit errors.

OBJECT OF THE INVENTION

The object of my present invention, therefore, is to provide a system for binary-signal transmission which obviates all the aforestated drawbacks.

SUMMARY OF THE INVENTION

A system according to my invention, designed for the transmission of binary signals between a first and a second station interconnected by a communication link, comprises clock means at the first station establishing a sequence of pulse cycles of predetermined duration T, these pulse cycles coinciding with two-level message pulses generated by a data source which is synchronized with the clock means. A transcoder at the first station, connected to the information source and to the clock means, converts each message pulse into a pair of mutually complementary binary pulses occurring in respective half-cycles of the corresponding pulse cycle, a train of these pulse pairs being transmitted by the transcoder to the remote second station via the associated communication link. In that train the order of occurrence of the complementary pulses of each pair within the corresponding pulse cycle depends upon the respective message-pulse level. At the second station, the incoming pulse train is received by input means connected to delay means for generating a replica of that incoming train which is phase-shifted by T/2 with reference thereto. The two relatively phase-shifted pulse trains are subtractively combined by algebraic summing means into a ternary pulse train with a high (e.g. positive), a low (e.g. negative) and an intermediate (e.g. zero) pulse level, the intermediate level occurring only in the first halves of certain cycles of the incoming train. A series of timing pulses are established by synchronizing means connected to the input means, these timing pulses normally occurring during the second halves of respective cycles of the incoming train; the ternary pulse train is sampled, at the instant of occurrence of each timing pulse, by a decision stage connected to the summing means and to the synchronizing means for generating a binary pulse sequence corresponding to the original message pulses.

According to a more particular feature of my invention, the synchronizing means at the second (receiving) station includes a differentiation circuit generating correlation pulses in response to level changes in the incoming train, pulse-generating means controlled by these correlation pulses for producing the series of timing pulses, phase-shifting means operable to displace these timing pulses by T/2 with respect to the ternary pulse train, an error-rate detector controlled by the timing pulses and by the incoming train for ascertaining a recurrent offset of the timing pulses from the second half-cycles of the incoming train, and resynchronization means responsive to the error-rate detector for operating the phase-shifting means whenever such as offset is found to occur at a rate exceeding a predetermined limit.

The pulse-generating means may comprise a square-wave oscillator with a 50% duty ratio, having an operating frequency of 2/T (or a period of T/2), and a first differentiator connected to this oscillator for deriving therefrom two interleaved trains of first and second switching pulses of the same cadence 2/T. The phase-shifting means may then comprise a bistable device or flip-flop which is alternately set and reset by the first switching pulses, with resulting generation of a reference wave of half the frequency of the aforementioned square wave, i.e. 1/T. A second differentiator, also forming part of the phase-shifting means, derives the timing pulses from this reference wave. The error-rate detector advantageously comprises logical circuitry emitting the aforesaid error pulse upon coincidence of a timing pulse with the first half of a cycle of the incoming train and an integrating circuit for generating a control signal rising in magnitude with successive error pulses. The resynchronization means generally comprises a threshold circuit for emitting a corrective pulse in the presence of one of the aforementioned second switching pulses whenever the integrated control signal surpasses a predetermined magnitude. The corrective pulse so generated is transmitted to the flip-flop for switching same out of turn, i.e. between recurrences of the first switching pulses, and also serves to reset the integrating circuit, thereby canceling the control signal.

BRIEF DESCRIPTION OF THE DRAWING

The above and other features of my invention will now be described in detail with reference to the accompanying drawing in which.

SPECIFIC DESCRIPTION

Figure 1:
FIG. 1 diagrammatically illustrates a signaling system according to my invention.

In FIG. 1 I have shown a transmitting station ST and a receiving station SR interconnected by a wide-band communication link 100, e.g. a metallic transmission line or an optical fiber. Stations ST and SR may be respective terminals of a PCM telecommunication system.

Figure 2:
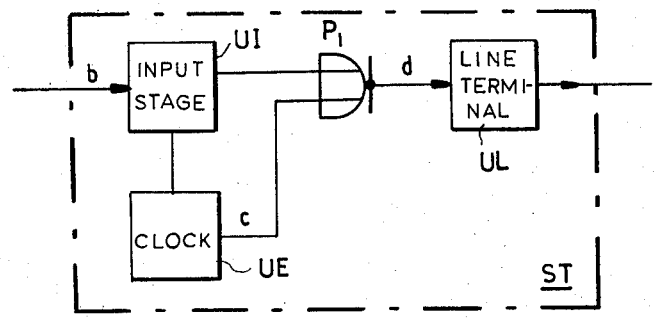
FIG. 2 is a block diagram of a transmitting station included in the system of FIG. 1.
Figure 6:
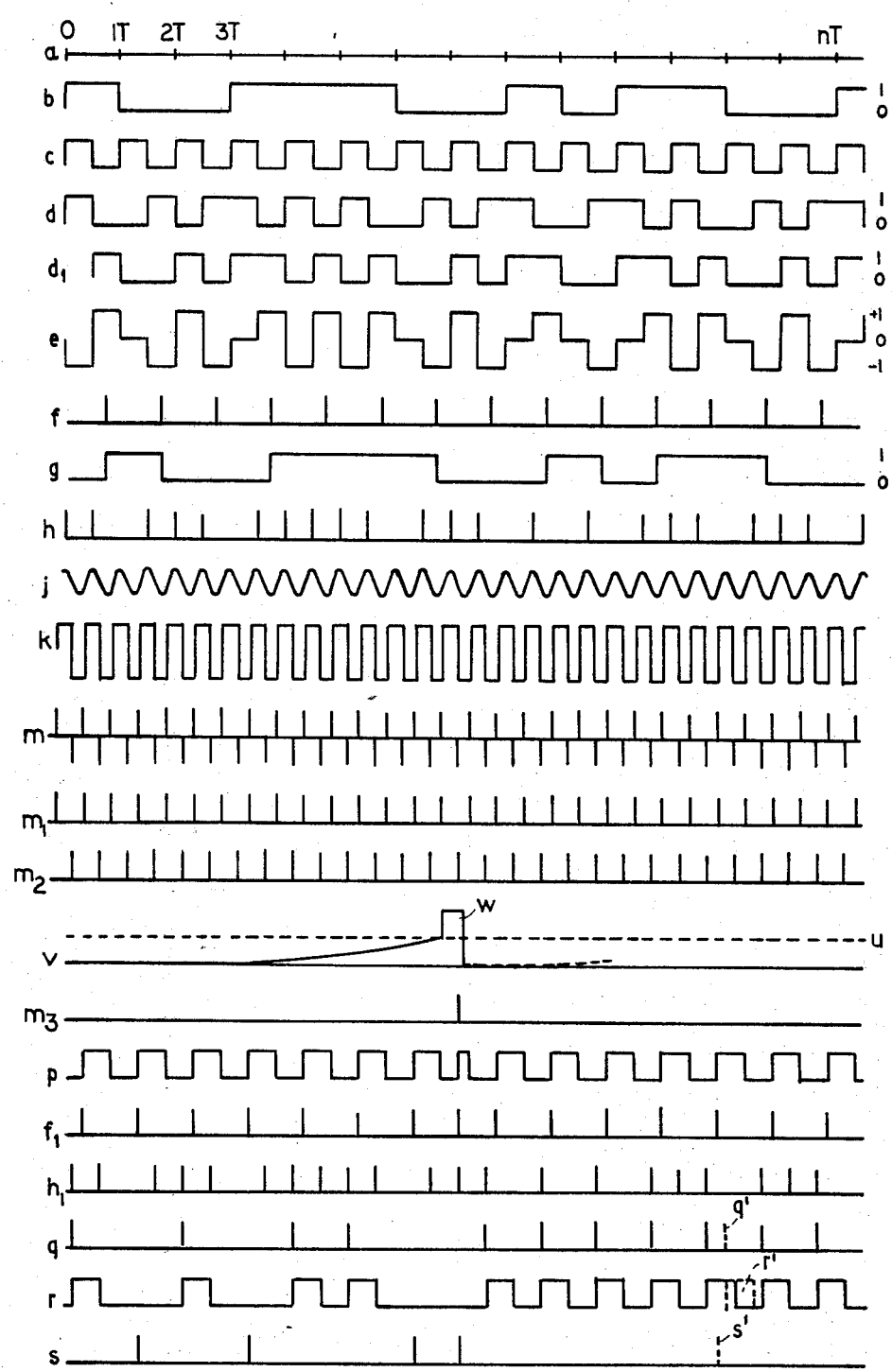
FIG. 6 is a set of graphs illustrating a variety of signals generated in the system according to my invention.

FIG. 2 shows details of transmitting station ST. An input stage UI receives a binary train b (see also FIG. 6) from a nonillustrated data source, the pulses of that train representing message bits occurring in successive cycles or time slots of duration T as shown in graph a of FIG. 6. Input stage UI is synchronized with a clock circuit UE which generates a square wave c of period T; as shown in FIG. 6, each pulse period T coincides in its first half with a positive half-cycle and in its second half with a zero (or possibly negative) half-cycle of wave c. Unit UE may be a sync-pulse extractor stepped by the pulse train b; it could also be a clock triggering the sampling of message signals upstream of input stage UI.

The two pulse trains b and c are fed to respective inputs of a transcoder in the form of an Exclusive-OR (XOR) gate $P_1$ with negated output to generate an outgoing pulse train d which is transmitted by a line terminal UL via communication link 100 to the remote station SR of FIG. 1. As will be apparent from FIG. 6, pulse train d is composed of consecutive pairs of mutually complementary binary pulses of width T/2 respectively occurring in the first and in the second half of any cycle of train b. In the instance here illustrated, each pulse of logical value "1" in train b generates a pulse pair "1-0" in train d; conversely, each pulse of logical value "0" in train b gives rise to a pulse pair "0-1" in train d. This is known in the art as the Manchester split-phase code. At the receiving station SR, the sequence d represents an incoming pulse train.

Figure 3:
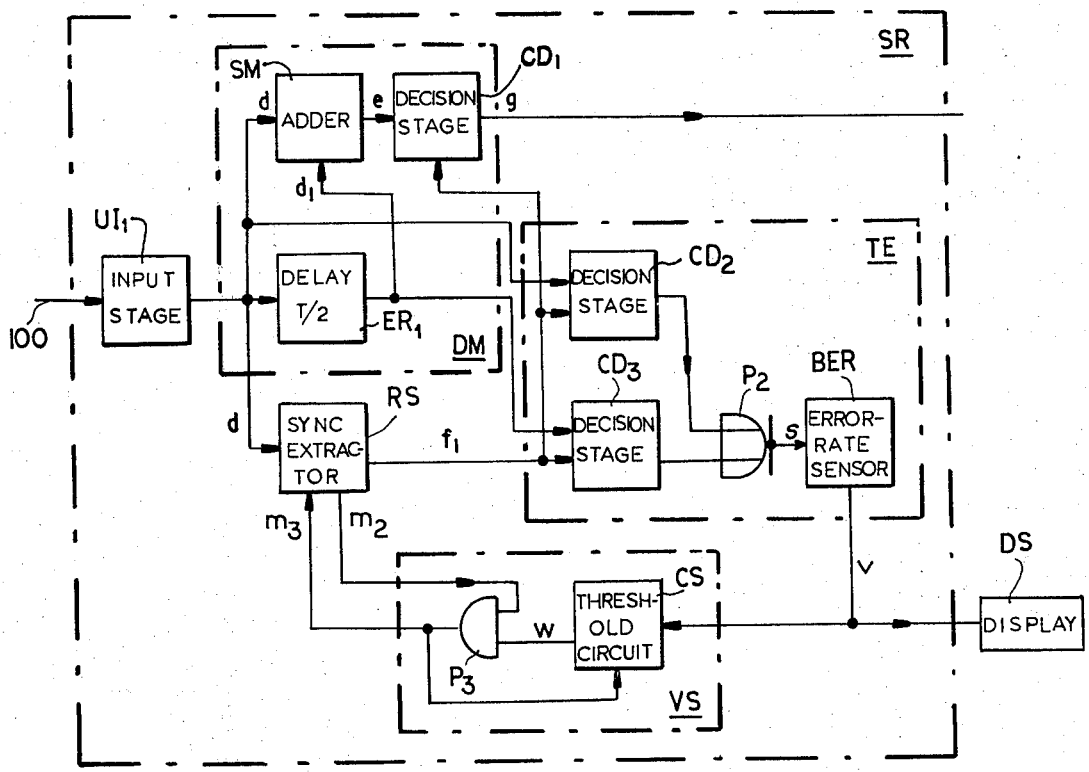
FIG. 3 is a block diagram of a receiving station included in this system.

As shown in FIG. 3, receiving station SR comprises an input stage $UI_1$ connected to communication link 100, this stage amplifying and filtering the incoming pulse train d and feeding it in parallel to a sync extractor RS, an algebraic summing circuit or adder SM and a delay line $ER_1$; the latter generates a replica $d_1$ of pulse train d staggered by an interval T/2 with respect thereto. Summing circuit SM receives the two trains $d_1$ and d on an additive and a subtractive input, respectively, so as to produce therefrom a ternary pulse train e with a high level "+1", an intermediate level "0" and a low level "−1". From FIG. 6, in which the pulse sequences d, $d_1$ and e have been represented over a time nT corresponding to n cycles T, it will be apparent that the intermediate level "0" never occurs in the second half of a pulse cycle but comes into existence only in the first halves of those cycles in which a level change takes place in the original binary pulse train b, e.g. as shown for the cycle 1T-2T. It will also be apparent that at instants f, midway in the second half of each pulse cycle, the ternary pulse train e assumes either of two distinct values ("+1" or "−1") corresponding to respective levels ("1" and "0") in the original binary train b.

Obviously, if the square wave c emitted by clock UE (FIG. 2) were shifted by T/2 with reference to pulse train b, summing circuit SM would have to subtract the delayed train $d_1$ from incoming train d in order to generate the equivalent of ternary train e. Alternatively, an inverter could be inserted downstream of circuit SM.

Circuits SM and $ER_1$ form part of a decoder DM also including a decision stage $CD_1$ of the sample-and-hold type which receives the ternary pulse train e from the summer SM for detecting the level of train e at the aforementioned instants, i.e. for discriminating between positive and negative polarities, in order to derive therefrom a binary signal g, equivalent to the original pulse train b, which is fed to a nonillustrated load. The sampling is carried out with the aid of timing pulses $f_1$ emitted by sync extractor RS in a manner described hereinafter with reference to FIG. 4.

The aforedescribed mode of operation of decoder DM results in an increase of the signal-to-noise ratio by 3 dB, making it equal to that realized in the transmission of pure binary signals. This follows from the fact that the additive superposition of coincident signal pulses of like magnitude entails a power gain of 6 dB whereas the concurrent superposition of uncorrelated noise signals increases their power by only 3 dB.

Figure 4:
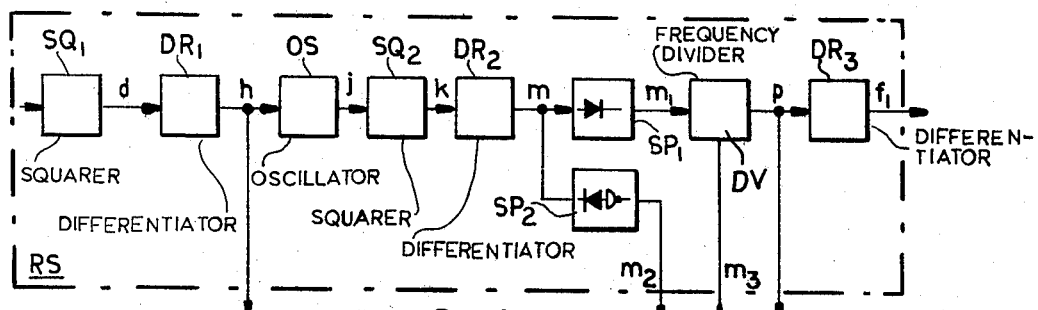
FIG. 4 is a more detailed block diagram of a synchronization extractor forming part of the receiving station of FIG. 3.

As illustrated in FIG. 4, unit RS comprises a squarer $SQ_1$ which eliminates residual distortions of the incoming pulse train d and feeds it to a differentiator $DR_1$ producing a train of correlation pulses h in response to changes in signal level, i.e. transitions from "0" to "1" or vice versa; this differentiator includes a nonillustrated rectifier for making all the pulses h of the same polarity. Such a correlation pulse h, therefore, occurs invariably in the middle and intermittently at the end of a pulse cycle. A local oscillator OS of operating frequency 2/T, kept in step with pulse train e by these correlation pulses h, works into a squarer $SQ_2$ converting a sine wave j into a square wave k of the same frequency. A differentiator $DR_2$ derives bipolar pulses m of alternate polarity from square wave k and feeds them in parallel to a pair of pulse separators $SP_1$ and $SP_2$ essentially consisting of two oppositely poled rectifiers; pulse separator $SP_2$, however, also includes an inverter so that switching pulses $m_1$ and $m_2$ respectively issuing from the two pulse separators are of the same polarity (here positive). These two series of switching pulses are relatively staggered by an interval T/4. Pulses $m_1$ are delivered to a switching input of a bistable circuit or flip-flop DV, acting as a frequency divider, which generates a reference square wave p of frequency 1/T. A further differentiator $DR_3$ derives the timing pulses $f_1$ from the positive-going transitions of reference wave p.

Evidently, the relative phasing of reference wave p and pulse train e is indeterminate and depends, inter alia, on the initial state of flip-flop DV so that the timing pulses $f_1$ could come into existence either in the first or in the second half of any pulse cycle T. Circuits DV and $DR_3$ constitute, in effect, a selective phase shifter operable to invert the reference wave p so as to displace the timing pulses $f_1$ by a half-cycle T/2. If these timing pulses happen to coincide with the wrong portions of pulse train e, that is to say if they occur in the first halves of cycles T, the decoded signal g will not correspond to the original pulse train b. It is therefore necessary to provide corrective circuitry TE which restores the proper phase relationship upon detecting an error pattern indicative of a sustained disalignment between the unsuppressed timing pulses $f_1$ and the theoretical sampling or decision instants f.

In FIG. 3 the corrective circuitry TE comprises two further decision stages $CD_2$ and $CD_3$ receiving the timing pulses $f_1$ in parallel with stage $CD_1$ from extractor RS, stage $CD_2$ also receiving the incoming train d whereas stage $CD_3$ is connected to the output of delay line $ER_1$ carrying its retarded replica $d_1$. As will be apparent from the corresponding graphs of FIG. 6, pulse trains d and $d_1$ always have different magnitudes at the correct sampling instants f but, with a probability of 50%, could have the same magnitude at intervening instants, i.e. in the first halves of certain cycles T. The outputs of stages $CD_2$ and $CD_3$ are connected to respective inputs of an inverting anticoincidence or XOR gate $P_2$ which therefore emits an error pulse s whenever the samples taken from pulse trains d and $d_1$ have the same logical value, i.e. when the ternary pulse train e issuing from adder SM is at its intermediate level "0". These error pulses s are integrated in a bit-error-rate detector BER which produces a control signal v rising at a rate determined by the time constant of an integrating network formed in part by impedances within the detector BER and in part by a capacitance in a threshold circuit CS of a resynchronization unit VS. When the voltage across that capacitance reaches a predetermined limit u (FIG. 6), e.g. the breakdown potential of a Zener diode, circuit CS feeds an unblocking pulse w to an AND gate $P_3$ also receiving the alternate switching pulses $m_2$ from sync extractor RS, i.e. from pulse separator $SP_2$ shown in FIG. 4. In the presence of this unblocking pulse w, therefore, gate $P_3$ conducts and passes the next pulse $m_2$ as a corrective pulse $m_3$ to the switching input of flip-flop DV which is thereby set or reset out of turn to reverse the phase of reference wave p. Pulse $m_3$ is also fed back to threshold circuit CS to discharge its storage capacitor, thus effectively resetting the detector BER by canceling the control signal v and terminating the unblocking pulse w. Signal v is also transmitted to a display device DS for visualization.

The operation of the resynchronization unit VS is depicted in graph $f_1$ of FIG. 6 which shows the timing pulses initially disaligned with the sampling instants f but falling into line therewith upon the appearance of the corrective pulse $m_3$.

Figure 5:
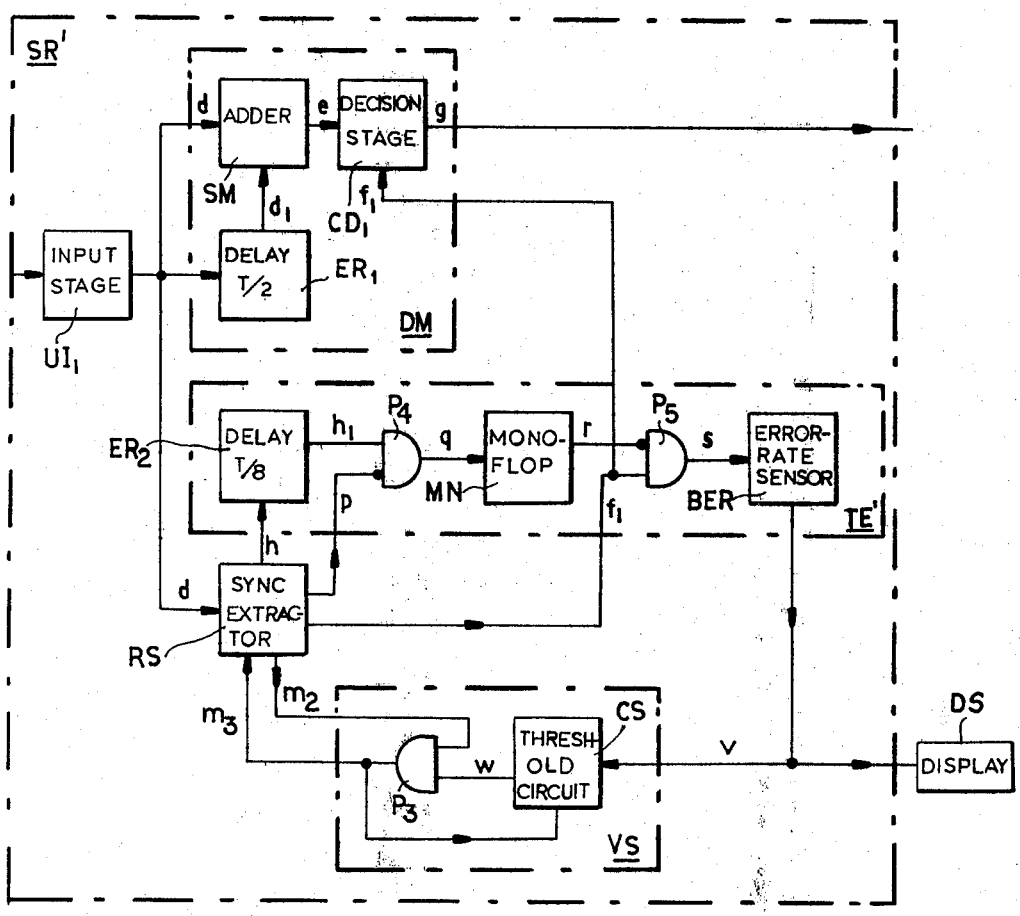
FIG. 5 is a block diagram similar to FIG. 3, illustrating a modified receiving station.

The receiving station SR' of FIG. 5 differs from station SR of FIG. 3 only in the design of its corrective circuitry TE'. That circuitry comprises another delay line $ER_2$ which receives the correlation pulses h from sync extractor RS and retards them by a small fraction of a pulse cycle T, here T/8, to generate an identical sequence of marker pulses $h_1$ which occur about midway within half-cycles of reference wave p (taking into account the various delays occurring elsewhere in the circuits). Marker pulses $h_1$ are fed to a noninverting input of an AND gate $P_4$ which receives on an inverting the reference wave p from the flip-flop DV (FIG. 4) of circuit RS. Since a correlation pulse h occurs regularly in the middle and irregularly at the end of a pulse cycle T, as noted above, a marker pulse $h_1$ will always come into existence in the second half-cycle and will also appear with a 50% probability in the first half of any cycle in which the ternary train e is at its intermediate level "0". Normally, with wave p properly phased relative to pulse train d as shown in the right-hand half of FIG. 6, the regularly spaced marker pulses $h_1$ will coincide with a low level of reference wave p and will therefore pass the gate $P_4$ to produce a trigger pulse q at an instant preceding the next timing pulse $f_1$ by about T/8. The irregularly occurring interleaved marker pulses, coinciding with high levels of wave p, are then blocked. Trigger pulses q trip a monostable circuit or monoflop MN with an off-normal period T/2 to generate a series of masking pulses r delivered to an inverting input of a further AND gate $P_5$ whose other, noninverting input receives the timing pulses $f_1$ from unit RS. Under these circumstances, gate $P_5$ does not conduct. If, however, reference wave p is out of phase as shown at left in FIG. 6, the regular marker pulses will be blocked and the irregular ones will pass the gate $P_4$ to generate trigger pulses q with the result that a masking pulse r will be missing upon the occurrence of certain timing pulses $f_1$ so that AND gate $P_5$ conducts and transmits an error pulse s to detector BER. The latter coacts in the aforedescribed manner with resynchronization unit VS to produce a corrective pulse $m_3$ whenever these error pulses recur at a rate exceeding a predetermined threshold, e.g. one pulse per 100 cycles.

Noise superimposed upon the useful signal may advance or retard the level changes of pulse train d so as to cause a jitter in the positions of pulses h, $h_1$, q and r. Thus, even with the timing pulses $f_1$ correctly phased, such phase jitter may result in a shifting of a trigger pulse q by an interval greater than T/4 into a position q', with a corresponding displacement of a masking pulse to a position r'. This will give rise to a spurious error pulse s' which, however, will not by itself generate a corrective pulse $m_3$. Statistically, such spurious bit errors may occur at a very low rate, e.g. of less than one in a million cycles.

I claim:

1. A system for the transmission of binary signals, comprising:
    a first station and a second station interconnected by a communication link;
    clock means at said first station establishing a sequence of pulse cycles of predetermined duration T;
    a data source generating two-level message pulses synchronized with said clock means to coincide with said pulse cycles;
    transcoding means at said first station connected to said source and to said clock means for converting each message pulse into a pair of mutually complementary binary pulses occurring in respective half-cycles of the corresponding pulse cycle, the order of occurrence of said complementary pulses depending upon the respective message-pulse level, said transcoding means being connected to said communication link for transmitting a train of said complementary binary pulses to said second station;
    input means at said second station connected to said communication link for receiving an incoming train of said complementary binary pulses;
    delay means connected to said input means for generating a replica of said incoming train phase-shifted by T/2 with reference thereto;
    algebraic summing means connected to said input means and to said delay means for subtractively combining said incoming train and said replica thereof into a ternary pulse train with a high, a low and an intermediate pulse level, said intermediate level occurring only in the first halves of certain cycles of said incoming train;
    synchronizing means connected to said input means for establishing a series of timing pulses normally occurring during the second halves of respective cycles of said incoming train; and decision means connected to said summing means and to said synchronizing means for sampling said ternary pulse train at the instant of occurrence of each timing pulse to generate a binary pulse sequence corresponding to said message pulses.

2. A system as defined in claim 1 wherein said clock means comprises a square-wave generator with a 50% duty ratio, said transcoding means comprising an Exclusive-OR gate with inputs connected to said source and to said generator.

3. A system as defined in claim 1 or 2 wherein said synchronizing means comprises a differentiation circuit communicating with said input means for generating correlation pulses in response to level changes in said incoming train, pulse generating means connected to said differentiation circuit and controlled by said correlation pulses for producing said series of timing pulses, phase-shifting means included in said pulse-generating means and operable to displace said timing pulses by T/2 with respect to said ternary pulse train, an error-rate detector connected to said pulse-generating means and to said input means and controlled by said timing pulses and by said incoming train for ascertaining a recurrent offset of said timing pulses from the second half-cycles of said incoming train, and resynchronization means connected to said error-rate detector for operating said phase-shifting means upon said offset recurring at a rate exceeding a predetermined limit.

4. A system as defined in claim 3 wherein said pulse-generating means comprises a square-wave oscillator with a 50% duty ratio, having an operating frequency of 2/T, and a first differentiator connected to said square-wave oscillator for deriving therefrom two interleaved trains of first and second switching pulses of the same cadence 2/T; said phase-shifting means comprising bistable means connected for alternate setting and resetting by said first switching pulses, with resulting generation of a reference wave of frequency 1/T, and a second differentiator connected to said bistable means for deriving said timing pulses from said reference wave; said error-rate detector comprising logical circuitry communicating with said pulse-generating means and with said input means for emitting an error pulse upon coincidence of a timing pulse with a first half of a cycle of said incoming train and intergrating means connected to said logical circuitry for generating a control signal rising in magnitude with successive error pulses; said resynchronization means comprising a threshold circuit connected to said integrating means and provided with gating means connected to said first differentiator for emitting a corrective pulse in the presence of one of said second switching pulses upon said control signal surpassing a predetermined magnitude, said corrective pulse being transmitted to said bistable means for switching same between recurrences of said first switching pulses, said integrating means being resettable by said corrective pulse vai a feedback connection from said gating means to cancel said control signal.

5. A system as defined in claim 4 wherein said logical circuitry comprises a pair of sampling circuits both connected to said pulse-generating means and respectively connected to said input means and to said delay means for detecting the levels of said incoming train and said replica at the instant of each timing pulse, and an anticoincidence gate connected to receive the detected levels from the outputs of said sampling circuits for generating an error pulse in the presence of like levels at both said outputs.

6. A system as defined in claim 4 wherein said logical circuitry comprises retarding means connected to said differentiation means for receiving said correlation pulses therefrom and reproducing same as a series of marker pulses occurring substantially midway during alternations of said reference wave, a first coincidence gate connected to said retarding means and to said bistable means for emitting a trigger pulse upon coincidence of a marker pulse with an alternation of predetermined polarity of said reference wave, monostable means connected to said first coincidence gate for tripping by said trigger pulse to produce a masking pulse of duration T/2, and a second coincidence gate connected to said monostable means and to said second differentiator for emitting an error pulse upon the occurrence of a timing pulse in the absence of a masking pulse.

* * * * *